(12) United States Patent
Huprikar et al.

(10) Patent No.: US 7,207,684 B2
(45) Date of Patent: Apr. 24, 2007

(54) EXTERIOR MIRROR ASSEMBLY ISOLATED BY ELASTOMERIC MATERIAL

(75) Inventors: Anand Huprikar, Novi, MI (US); Daniel G. Dickson, West Bloomfield, MI (US); Michael Kronell, Jr., Wyandotte, MI (US)

(73) Assignee: BASF Corporation, Florham Park, NJ (US)

( * ) Notice: Subject to any disclaimer, the term of this patent is extended or adjusted under 35 U.S.C. 154(b) by 22 days.

(21) Appl. No.: 11/153,669

(22) Filed: Jun. 15, 2005

(65) Prior Publication Data

US 2006/0285236 A1    Dec. 21, 2006

(51) Int. Cl.
  *G02B 7/18*  (2006.01)
  *B60R 1/076*  (2006.01)
(52) U.S. Cl. ....................... 359/841; 248/479
(58) Field of Classification Search ............... 359/841; 248/570, 636, 562, 479, 900
  See application file for complete search history.

(56) References Cited

U.S. PATENT DOCUMENTS

| 1,132,954 | A | * | 3/1915 | Galloway ................. 4/425 |
| 3,730,474 | A | | 5/1973 | Bowers |
| 3,887,156 | A | | 6/1975 | Hugonnier |
| 4,186,905 | A | | 2/1980 | Brudy |
| 4,306,701 | A | * | 12/1981 | Nierhaus et al. ............ 248/479 |
| 4,728,181 | A | | 3/1988 | Kakinuma |
| 5,005,797 | A | | 4/1991 | Maekawa et al. |
| 5,028,029 | A | * | 7/1991 | Beck et al. ................. 248/479 |
| 5,069,410 | A | * | 12/1991 | McKee ..................... 248/475.1 |
| 5,332,186 | A | | 7/1994 | Lutz |
| 5,432,640 | A | | 7/1995 | Gilbert et al. |
| 5,678,945 | A | | 10/1997 | Fimeri |
| 5,969,890 | A | | 10/1999 | Whitehead |
| 6,059,415 | A | | 5/2000 | Moreno et al. |
| 6,183,098 | B1 | | 2/2001 | Martin |
| 6,926,414 | B2 | * | 8/2005 | Van Stiphout ............. 359/841 |
| 7,093,946 | B2 | * | 8/2006 | Barve et al. ............... 359/841 |

FOREIGN PATENT DOCUMENTS

EP          173113 A1 *  3/1986
WO   WO02/072388 A1 *  9/2002

* cited by examiner

*Primary Examiner*—Leonidas Boutsikaris
*Assistant Examiner*—Mark Consilvio
(74) *Attorney, Agent, or Firm*—Fernando A. Borrego

(57) ABSTRACT

An exterior mirror assembly for a vehicle having a housing rotatably mounted to a base between an operable position and a retracted position. A mirror is supported by the housing and is movable with the housing between the positions. A female detent is disposed on the shaft of the base. A male detent is disposed on the housing within the chamber and is aligned with the female detent when the housing is in the operable position and is misaligned with the female detent when the housing is in the retracted position. An elastomeric material is disposed within the chamber between the shaft and the housing and between the detents for isolating movement between the base and the housing and for resisting the rotational movement of the housing relative to the base.

17 Claims, 5 Drawing Sheets

EXTERIOR MIRROR ASSEMBLY ISOLATED BY ELASTOMERIC MATERIAL

BACKGROUND OF THE INVENTION

1. Field of the Invention

The subject invention relates to exterior mirror assemblies for vehicles that are movable between operable and retracted positions.

2. Description of Related Art

Vehicle exterior mirror assemblies that can manually or automatically move between operable and retracted positions are well known to those skilled in the art. Often the prior art mirror assemblies include a base and a pivotal housing with a preloaded spring mechanism disposed between the base and the housing. The spring mechanism holds the assembly together and maintains the stability and integrity of the assembly. The spring mechanism also biases the housing to the operable position. A pair of detents are typically provided between the base and the housing to define the operable position and to provide a level of resistance when the housing moves from the operable position to the retracted position. Examples of these prior art mirror assemblies are shown in U.S. Pat. Nos. 4,186,905; 5,332,186; 5,432,640; and 5,678,945. The prior art mirror assemblies have a tendency to translate vibration of the vehicle into the mirror glass, which in turn vibrates the glass. Also, noise can transmit through the spring mechanism into the vehicle.

Other prior art mirror assemblies have attempted to overcome the vibrational and noise issues by incorporating some type of insulator into the assembly. For example, U.S. Pat. Nos. 4,728,181 and 5,005,797 incorporate elastomeric insulators between the base and the housing, with or without spring mechanisms, to isolate any vibration and/or noise.

Although the prior art has attempted to address a number of issues associated with vibration and noise of retractable mirror assemblies, there remains an opportunity to optimize these assemblies and to further improve over the prior art.

SUMMARY OF THE INVENTION AND ADVANTAGES

An exterior mirror assembly for a vehicle comprising a base having a shaft and adapted to be mounted to the vehicle. A housing is rotatably mounted to the base and defines a chamber disposed about the shaft with the housing selectively rotating between an operable position and a retracted position. A mirror is supported by the housing and is movable with the housing between the positions. A first detent is disposed on the shaft of the base. A second detent is disposed on the housing within the chamber and is aligned with the first detent when the housing is in the operable position and is misaligned with the first detent when the housing is in the retracted position. An elastomeric material is disposed within the chamber between the shaft and the housing and between the detents for isolating and resisting rotational movement between the housing and the base.

Accordingly, the subject invention provides for an improved mirror assembly that utilizes an elastomeric material to optimize the isolation characteristics between the base and the housing and to operate as both a spring and as a dampener. The mirror assembly also includes a simplified set of detents that make use of the elastomeric material.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
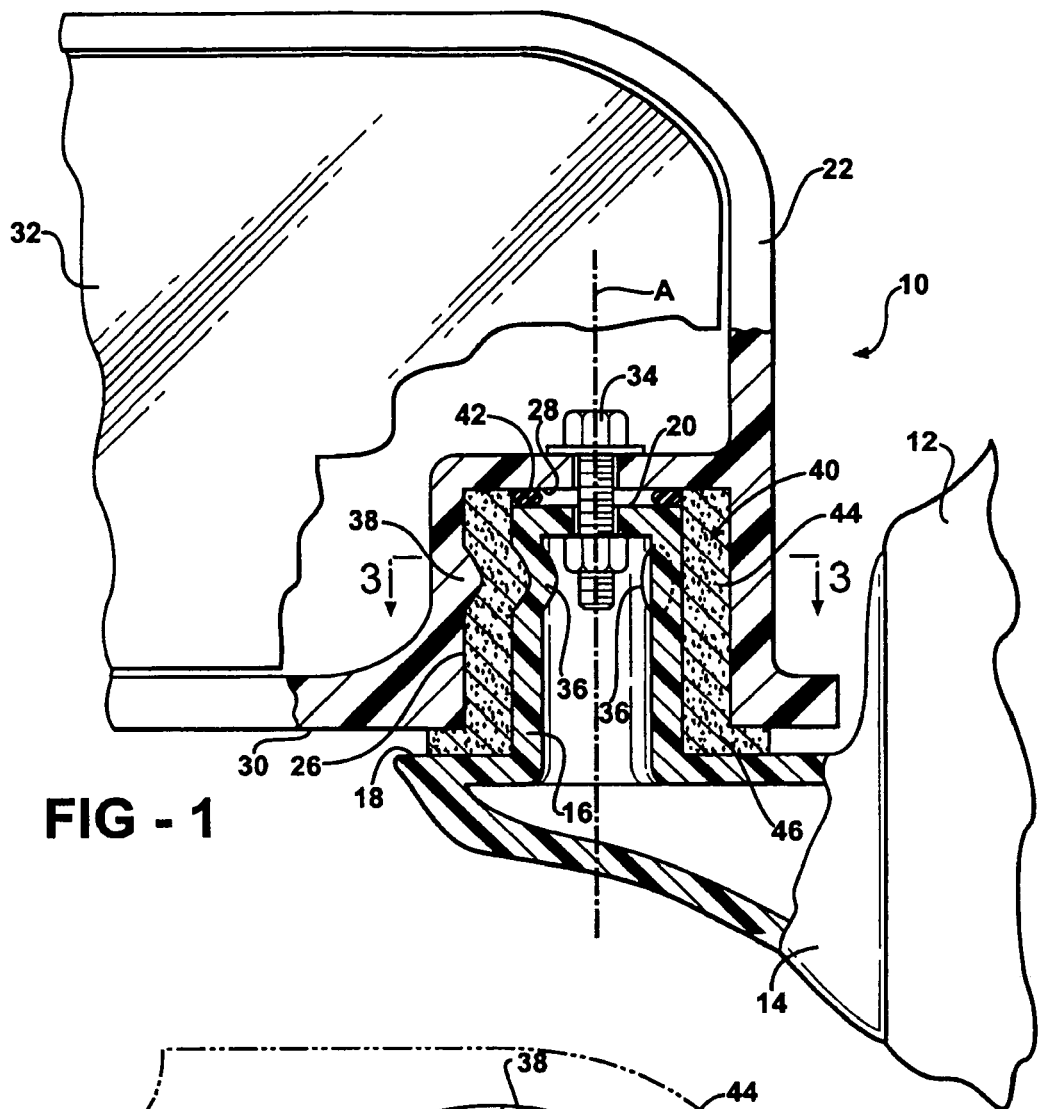
FIG. 1 is a fragmented partially cross-sectional view of an exterior mirror assembly in accordance with the subject invention.
Figure 2:
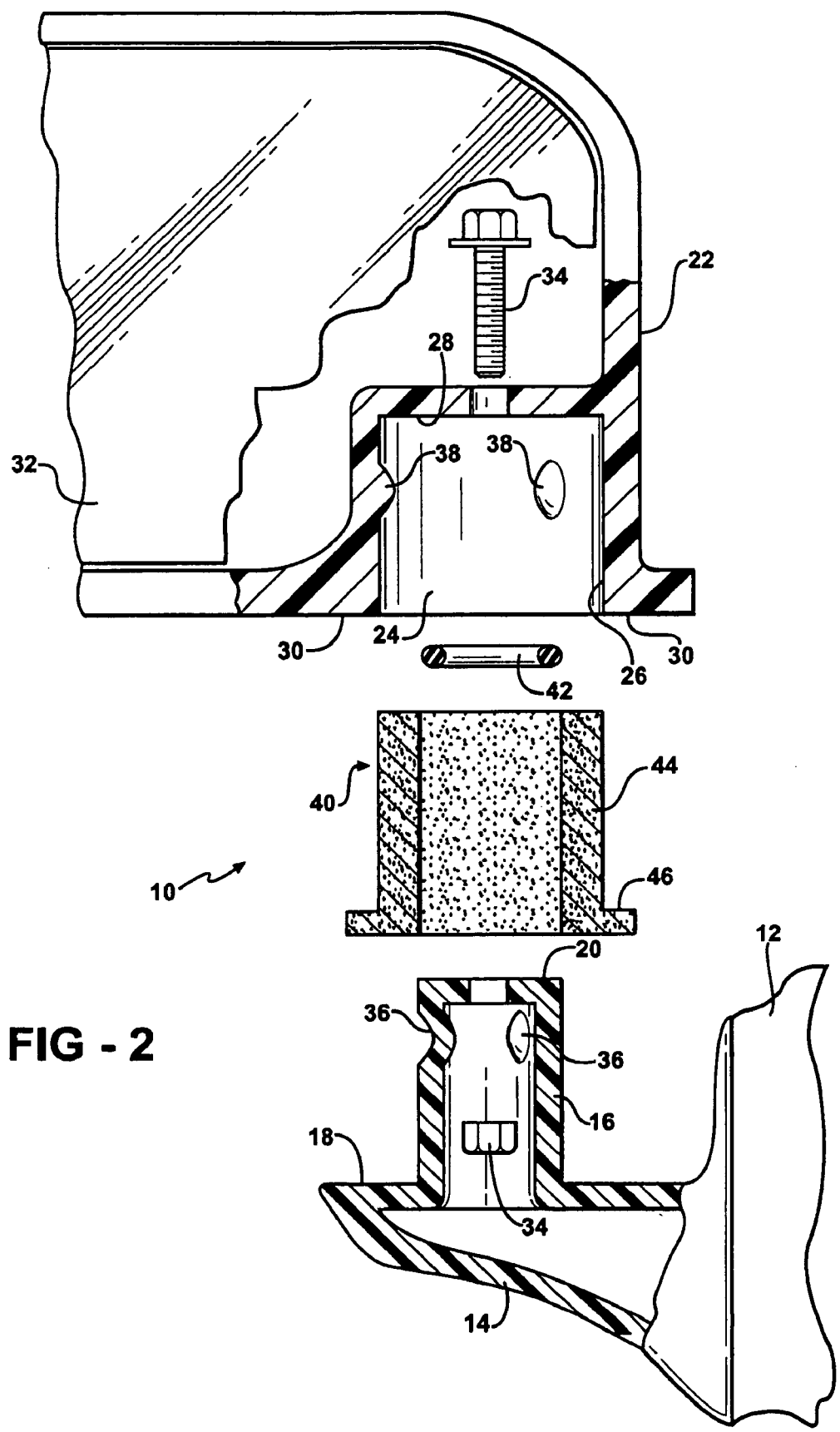
FIG. 2 is an exploded partially cross-sectional view of the mirror assembly.

Referring to the Figures, wherein like numerals indicate like or corresponding parts throughout the several views, an exterior mirror assembly for a vehicle is generally shown at 10 in FIGS. 1 and 2. The exterior mirror assembly 10 may be mounted to a door 12 or any other exterior panel of the vehicle as is known in the art. The exterior mirror assembly 10 comprises a base 14 having a shaft 16. The base 14 is adapted to be mounted to the vehicle by any suitable fastener. The base 14 may be formed of metal or plastic and may be of any suitable configuration. The base 14 preferably includes a substantially flat floor 18. The shaft 16 may also be of any suitable size or configuration and is preferably of a generally tubular configuration with a substantially closed top 20.

The exterior mirror assembly 10 also includes a housing 22 rotatably mounted to the base 14 and defining a chamber 24 disposed about the shaft 16. The chamber 24 includes an inner surface 26 and a roof 28. The shaft 16 of the base 14 is spaced from the inner surface 26 to define a substantially continuous cavity between the shaft 16 and the inner surface 26. The top 20 of the shaft 16 is also spaced from the roof 28 to further define the cavity. The housing 22 also includes a bottom surface 30 spaced from the floor 18 of the base 14. It should be appreciated that the housing 22 may be formed of metal or plastic and may have any suitable configuration.

A mirror 32 is supported by the housing 22 by any suitable device as is known in the art. The mirror 32 is preferably movable relative to the housing 22 to adjust a viewing angle of a driver or passenger of the vehicle. A fastener 34, such as a nut and bolt, interconnects the housing 22 to the base 14. Preferably, the fastener 34 passes through the roof 28 of the chamber 24 and the top 20 of the shaft 16 to interconnect the housing 22 to the base 14.

Figure 3:
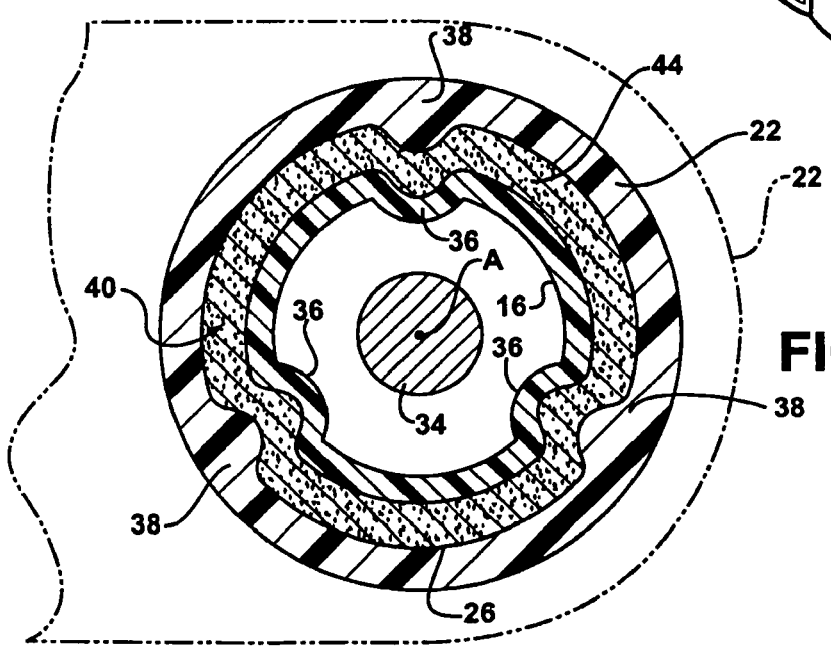
FIG. 3 is a cross-sectional view of the mirror assembly in an operable position taken along line 3—3 of FIG. 1.
Figure 4:
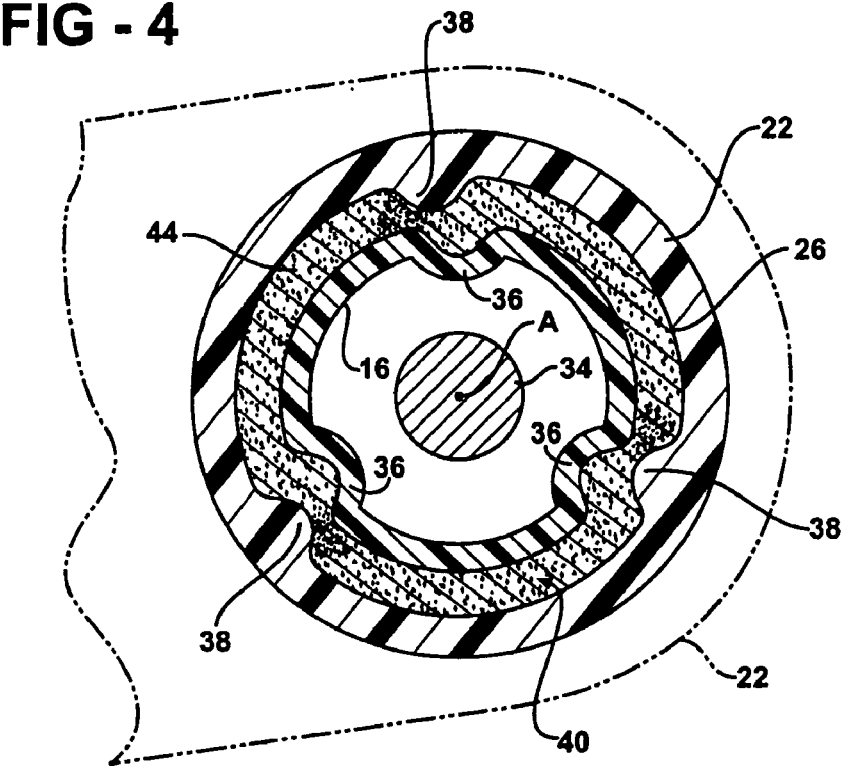
FIG. 4 is a cross-sectional view of the mirror assembly in a transition position.
Figure 5:
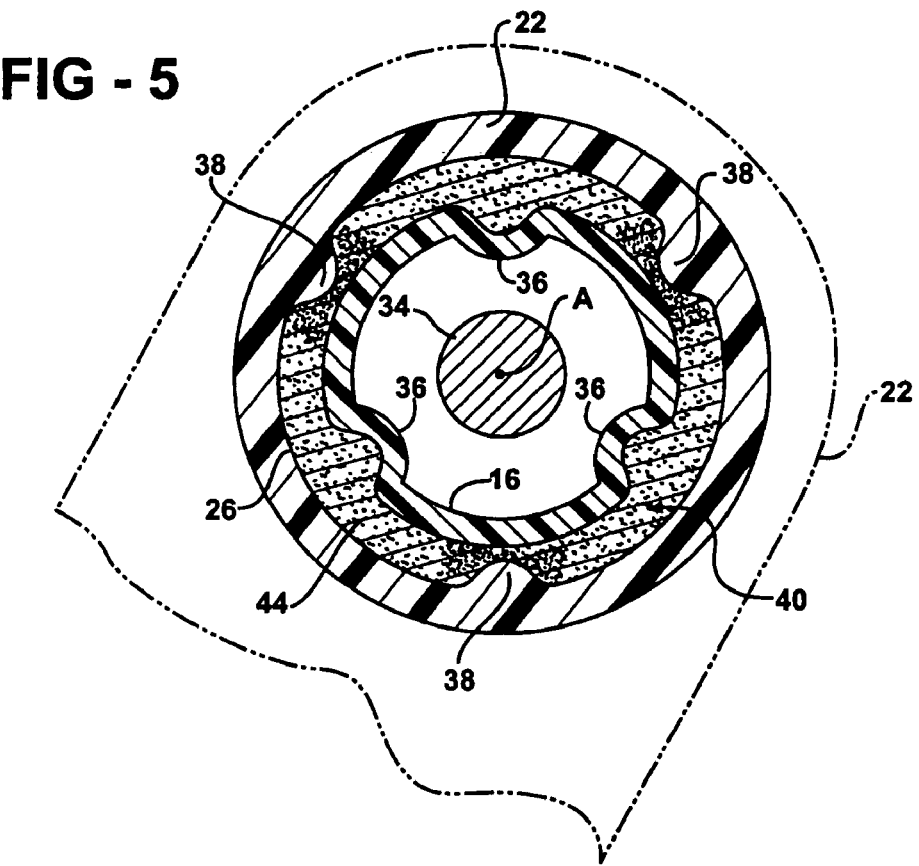
FIG. 5 is a cross-sectional view of the mirror assembly in a retracted position.

Referring also to FIGS. 3–5, the housing 22 selectively rotates between an operable position and a retracted position relative to the base 14. In particular, the shaft 16 defines an axis of rotation A for the housing 22. As orientated in the Figures, the axis of rotation A is generally in the vertical direction. The operable position is shown in FIGS. 1 and 3 and generally orientates the housing 22 to project outwardly from the vehicle. When desired, the housing 22 can rotate through a transition position shown in FIG. 4 to a retracted position shown in FIG. 5. The mirror 32, which is supported by the housing 22, moves with the housing 22 between the positions. The housing 22 is typically retracted when hit by an exterior object, which is designed to reduce the likelihood of the housing 22 and/or mirror 32 being damaged. The housing 22 can also be retracted either manually or automatically to reduce the overall width of the vehicle, such as during parking of the vehicle.

In order to define the operable position of the housing 22 and to provide a level of resistance when the housing 22 moves through the transition position to the retracted position, a pair of detents 36, 38 are provided. In particular, a first detent 36 is disposed on the shaft 16 of the base 14 and a second detent 38 is disposed on the housing 22 within the chamber 24. The second detent 38 is aligned with the first detent 36 when the housing 22 is in the operable position, thereby defining the operable position. The second detent 38 is misaligned with the first detent 36 when the housing 22 moves to the retracted position. In the retracted position, the second detent 38 could remain misaligned relative to the first detent 36 or could align with a different first detent 36. The second detent 38 is disposed on the inner surface 26 of the chamber 24 and the first detent 36 is spaced from the second detent 38 to further define the continuous cavity between the shaft 16 and the inner surface 26.

In one embodiment, one of the first 36 and second detents 38 is further defined as a recess and the other of the first 36 and second detents 38 is further defined as a projection complementary in configuration with the recess. Preferably, the first detent 36 is further defined as a recess and the second detent 38 is further defined as a projection complementary in configuration with the recess. As best shown in FIGS. 2–5, a plurality of first detents 36, such as three, are disposed on the shaft 16 and a plurality of second detents 38, such as three, are disposed on the housing 22. Each of the second detents 38 are aligned with a corresponding first detent 36 when the housing 22 is in the operable position and are misaligned with the first detents 36 when the housing 22 moves to the retracted position. Preferably, each of the first detents 36 is a female detent defining a recess and each of the second detents 38 is a male detent defining a projection complementary in configuration with the recesses. In the most preferred embodiment, each of the recesses are identical and each of the projections are identical. As illustrated, each of the recesses define a smooth curvilinear dimple and each of the projections define a smooth curvilinear pimple of substantially the same width and depth as the dimples.

Referring back to FIGS. 1–5, an elastomeric material 40 is disposed within the chamber 24 between the shaft 16 and the housing 22 and between the detents 36, 38. The elastomeric material 40 isolates movement between the base 14 and the housing 22 and resists the rotational movement of the housing 22 relative to the base 14. Hence, the elastomeric material 40 operates as both a spring and as a dampener. The elastomeric material 40 is preferably disposed within the cavity to maintain the spacing of the base 14 from the inner surface 26 which eliminates noise from any metal-to-metal, plastic-to-plastic, or metal-to-plastic contact. The disposition of the elastomeric material 40 in the cavity also ensures complete isolation of movement between the base 14 and the housing 22. Further, the elastomeric material 40 is disposed within the cavity to maintain the spacing of the first detent 36 from the second detent 38. In other words, the elastomeric material 40 is disposed between the recesses and the projections of the detents 36, 38. The thickness of the elastomeric material 40 between the detents 36, 38 determines the level of resistance when rotating the housing 22 relative to the base 14, see FIGS. 4 and 5.

As best shown in FIG. 1, the elastomeric material 40 is disposed between the shaft 16 and the housing 22 along the axis of rotation A and extends above the top 20 and below the bottom surface 30 for isolating movement between the base 14 and the housing 22 in multiple directions. The length of the elastomeric material 40 extending above the top 20 and below the bottom surface 30 determines the degree of vertical load applied to the assembly and in turn the degree of resistance, or isolation, for the assembly. As discussed above, the configuration of the elastomeric material 40 prevents metal-to-metal, plastic-to-plastic, or metal-to-plastic contact. Specifically, the elastomeric material 40 is disposed between the floor 18 of the base 14 and the bottom surface 30 of the housing 22 for isolating movement between the base 14 and the housing 22 in a direction substantially parallel with the axis of rotation A, i.e., the vertical direction. Further, the elastomeric material 40 extends above the top 20 of the shaft 16 to the roof 28 of the chamber 24 for further isolating movement between the base 14 and the housing 22 in a direction substantially parallel with the axis of rotation A. A seal 42 may also be provided between the top 20 of the shaft 16 and the roof 28 of the chamber 24. In sum, the elastomeric material 40 is designed to operate as a spring to isolate vertical movement, to operate as a dampener to isolate vibration between the housing 22 and base 14, and to provide a level of resistance against rotating the housing 22 relative to the base 14.

As best shown in FIGS. 1 and 2, the elastomeric material 40 has a first portion 44 of a substantially tubular configuration disposed about the shaft 16 within the chamber 24 between the shaft 16 and the housing 22. The elastomeric material 40 also has a second portion 46 extending outwardly from the first portion 44 and disposed between the base 14 and the housing 22. The elastomeric material 40 therefore completely isolates movement of the housing 22 relative to the base 14 in any direction. The first 44 and second 46 portions of the elastomeric material 40 are formed of a common homogenous material. Preferably, the elastomeric material 40 is formed of micro-cellular polyurethane. It should be appreciated that the elastomeric material 40 may be formed of any suitable material so long as adequate deformation of the material can occur during pivotal movement of the housing 22 relative to the base 14.

Figure 6:
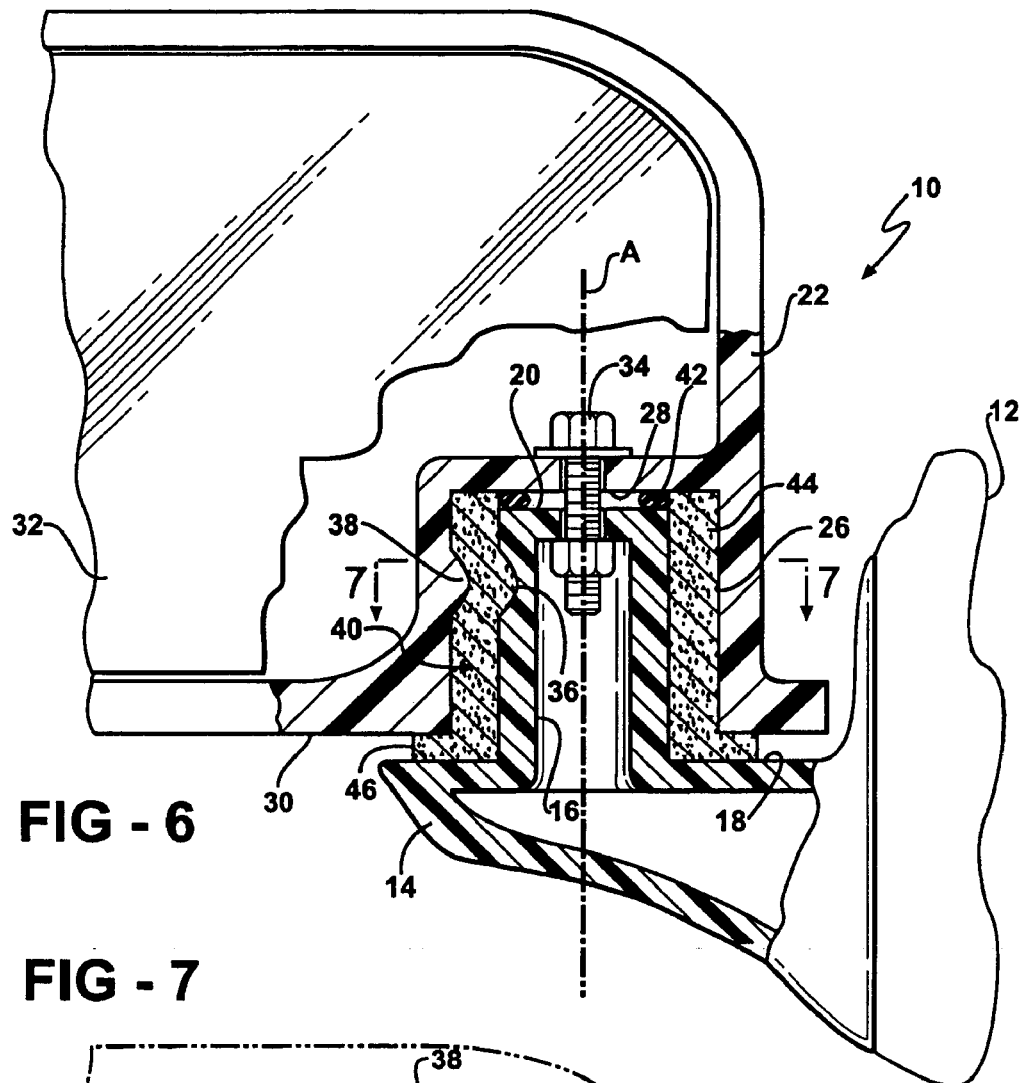
FIG. 6 is a fragmented partially cross-sectional view of an alternative embodiment of the exterior mirror assembly.
Figure 7:
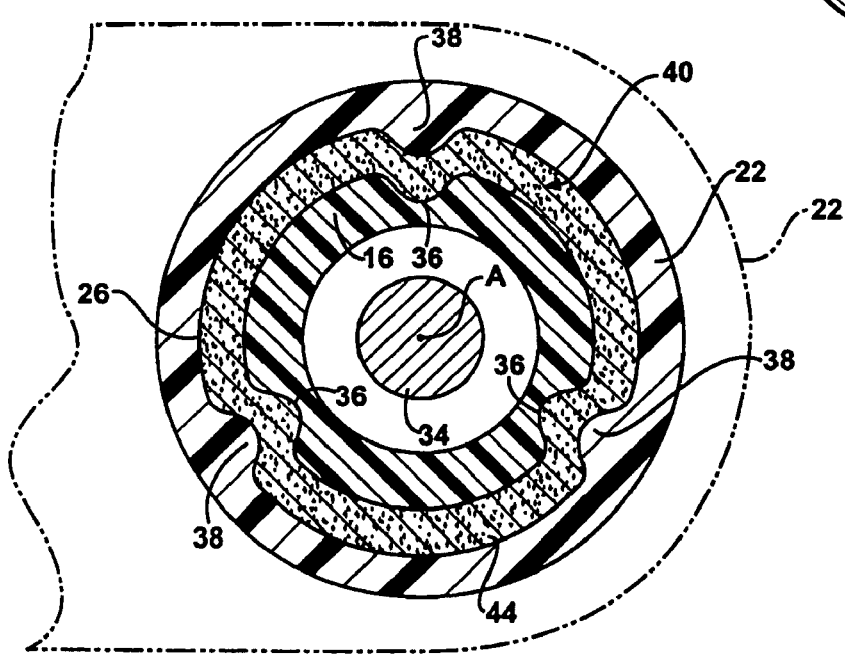
FIG. 7 is a cross-sectional view of the alternative mirror assembly in an operable position taken along line 7—7 of FIG. 6.

Turning to FIGS. 6 and 7, an alternative embodiment of the subject invention is shown. Many of the components of the embodiment of FIGS. 6–7 are similar or identical to the embodiment of FIGS. 1–5 discussed above. The primary difference between these two embodiments relates to the structural configuration of the shaft 16. In the embodiment of FIGS. 1–5, the walls of the shaft 16 maintain a continuous cross-section such that the second detents 38 project into the tubular shaft 16. Alternatively, in the embodiment of FIGS. 6–7, the walls of the shaft 16 vary in cross-section such that the second detents 38 are grooved out of the walls and do not project into the tubular shaft 16. In this alternative embodiment, the walls of the shaft 16 may be thickened to accommodate the second detents 38.

Figure 8:
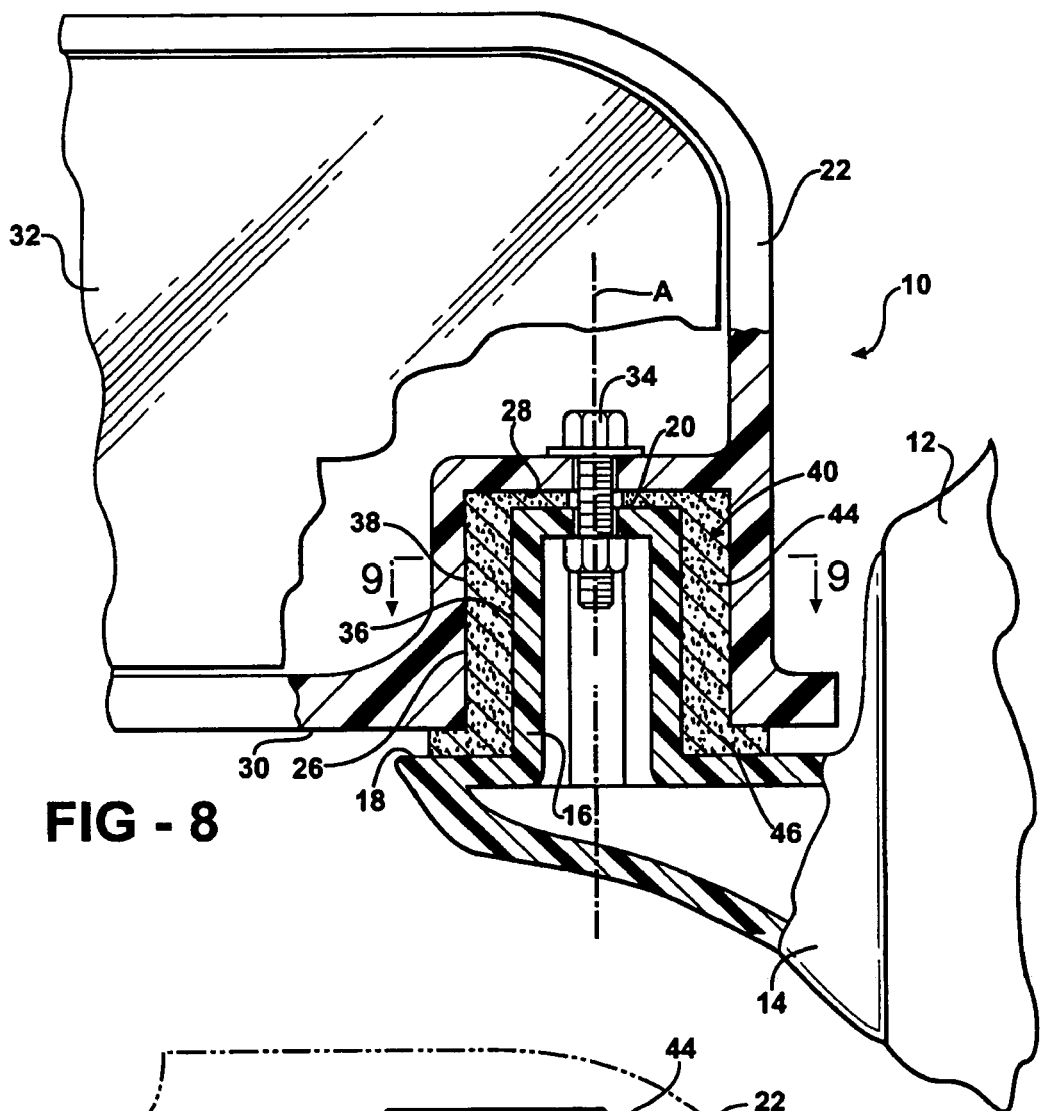
FIG. 8 is a fragmented partially cross-sectional view of another alternative embodiment of the exterior mirror assembly.
Figure 9:
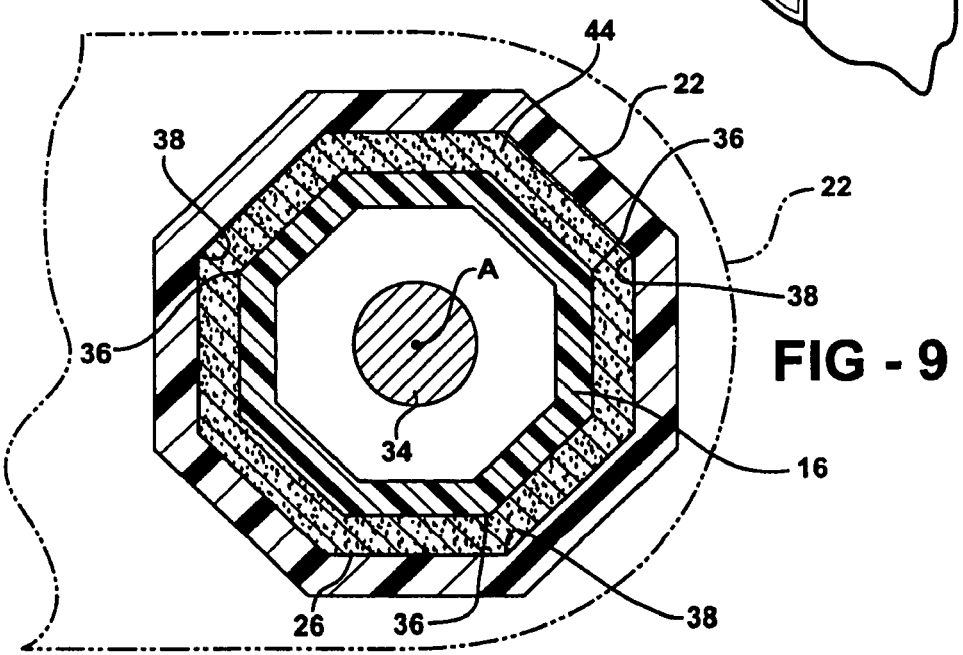
FIG. 9 is a cross-sectional view of the alternative mirror assembly in an operable position taken along line 9—9 of FIG. 8.

Referring to FIGS. 8 and 9, another alternative embodiment of the mirror assembly 10 is shown. The mirror assembly 10 of this embodiment includes a similar housing 22 rotatably mounted to a similar base 14. The primary difference in the embodiment of FIGS. 8 and 9 relates to the configuration of the first 36 and second 38 detents. In this embodiment, the first detent 36 is further defined as a projecting edge and the second detent 38 is further defined as a recessed corner complementary in configuration with the edge. As best shown in FIG. 9, a plurality of first detents 36, such as eight projecting edges, are equally spaced about the shaft 16 and a plurality of second detents 38, such as eight recessed corners, are equally spaced within the chamber 24 of the housing 22. In particular, the first detents 36, the edges, are spaced apart by straight wall sections to define an octagon configured shaft 16. The second detents 38, the corners, are similarly spaced apart by straight wall sections to define a corresponding eight sided chamber 24. It should be appreciated that the configuration of the shaft 16 may be of any suitable polygon. In fact, the shaft 16 and chamber 24 may have a number of alternative configurations to define detents of different configurations.

The elastomeric material 40 is disposed between the corners and edges for resisting the rotational movement of the housing 22 relative to the base 14. As with the embodiments of FIGS. 1–7, the elastomeric material 40 is disposed between the shaft 16 and the housing 22 along the axis of rotation A and is disposed between the base 14 and the housing 22 transverse to the axis of rotation A for isolating movement between the base 14 and the housing 22 in multiple directions. This alternative embodiment further illustrates the design feature of extending the elastomeric material 40 above the top 20 of the shaft 16 to the roof 28 of the chamber 24 for isolating movement between the base 14 and the housing 22 in a direction substantially parallel with the axis of rotation A, i.e., the vertical direction. In this embodiment, the elastomeric material 40 replaces the seal 42. By placing the elastomeric material 40 between the top 20 and roof 28 and between the floor 18 and bottom surface 30, the elastomeric material 40 essentially acts as a spring to apply a vertical load to the assembly and to provide a level of resistance, or isolation, against forces applied in the vertical direction. The length of the elastomeric material 40 between the top 20 and roof 28 and between the floor 18 and bottom surface 30 determines the degree of vertical load applied to the assembly and in turn the degree of resistance, or isolation, for the assembly. The thickness of the elastomeric material 40 between the top 20 and roof 28 and between the floor 18 and bottom surface 30 also assists in determining the level of resistance during rotational movement of the housing 22 relative to the base 14.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. An exterior mirror assembly for a vehicle comprising:
 a base having a shaft and adapted to be mounted to the vehicle;
 a housing rotatably mounted to said base and defining a chamber disposed about said shaft with said housing selectively rotating between an operable position and a retracted position, said chamber including an inner surface continuously spaced from said shaft to define a substantially continuous cavity between said inner surface and said shaft;
 a mirror supported by said housing and movable with said housing between said positions;
 a first detent disposed on said shaft of said base;
 a second detent disposed on said inner surface of said chamber and spaced from said first detent to further define said cavity between said shaft and said inner surface with said second detent aligned with said first detent when said housing is in said operable position and misaligned with said first detent when said housing is in said retracted position; and
 an elastomeric material disposed within said cavity between said shaft and said inner surface of said chamber to maintain said continuous spacing of said inner surface from said shaft and for ensuring complete isolation of said housing from said base and disposed within said cavity between said detents for resisting rotational movement between said housing and said base.

2. An assembly as set forth in claim 1 wherein one of said first and second detents is further defined as a recess and the other of said first and second detents is further defined as a projection complementary in configuration with said recess with said elastomeric material disposed between said recess and said projection for resisting said rotational movement of said housing relative to said base.

3. An assembly as set forth in claim 1 wherein said first detent is further defined as a recess and said second detent is further defined as a projection complementary in configuration with said recess with said elastomeric material disposed between said recess and said projection for resisting said rotational movement of said housing relative to said base.

4. An assembly as set forth in claim 1 further including a plurality of first detents disposed on said shaft and a plurality of second detents disposed on said housing with each of said second detents aligned with a corresponding first detent when said housing is in said operable position and misaligned with said first detents when said housing is in said retracted position.

5. An assembly as set forth in claim 4 wherein said inner surface of said chamber extends between and about said second detents.

6. An assembly as set forth in claim 4 wherein each of said first detents is further defined as a recess and each of said second detents is further defined as a projection complementary in configuration with said recesses with said elastomeric material disposed between said recesses and said projections for resisting said rotational movement of said housing relative to said base.

7. An assembly as set forth in claim 6 wherein each of said recesses define a smooth curvilinear dimple and each of said projections define a smooth curvilinear pimple.

8. An assembly as set forth in claim 6 wherein each of said recesses are identical and each of said projections are identical.

9. An assembly as set forth in claim 1 wherein said first detent is further defined as a projecting edge and said second detent is further defined as a recessed corner complementary in configuration with said edge with said elastomeric material disposed between said corner and said edge for resisting said rotational movement of said housing relative to said base.

10. An assembly as set forth in claim 4 wherein each of said first detents is further defined as a projecting edge equally spaced about said shaft and each of said second detents is further defined as a recessed corner complementary in configuration with said edge and equally spaced within said chamber with said elastomeric material disposed between said corner and said edge for resisting said rotational movement of said housing relative to said base.

11. An assembly as set forth in claim 1 wherein said shaft defines an axis of rotation for said housing with said elastomeric material disposed between said shaft and said housing along said axis of rotation and disposed between said base and said housing transverse to said axis of rotation for isolating movement between said base and said housing in multiple directions.

12. An assembly as set forth in claim 11 wherein said base includes a floor and said housing includes a bottom surface spaced from said floor with said elastomeric material disposed between said floor and said bottom surface for isolating movement between said base and said housing in a direction substantially parallel with said axis of rotation.

13. An assembly as set forth in claim 11 wherein said shaft includes a top and said chamber includes a roof spaced from said top with said elastomeric material extending above said top to said roof for isolating movement between said base and said housing in a direction substantially parallel with said axis of rotation.

14. An assembly as set forth in claim 1 wherein said elastomeric material has a first portion of a substantially tubular configuration disposed about said shaft within said chamber between said shaft and said housing.

15. An assembly as set forth in claim 14 wherein said elastomeric material has a second portion extending outwardly from said first portion and disposed between said base and said housing.

16. An assembly as set forth in claim 15 wherein said first and second portions are formed of a common homogenous material.

17. An assembly as set forth in claim 1 wherein said elastomeric material is formed of micro-cellular polyurethane.

* * * * *